US012459262B2

(12) United States Patent
Yamada et al.

(10) Patent No.: US 12,459,262 B2
(45) Date of Patent: Nov. 4, 2025

(54) LIQUID EJECTION HEAD AND METHOD OF MANUFACTURING THE SAME

(71) Applicant: CANON KABUSHIKI KAISHA, Tokyo (JP)

(72) Inventors: Yuya Yamada, Tokyo (JP); Satoshi Ibe, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 177 days.

(21) Appl. No.: 18/450,285

(22) Filed: Aug. 15, 2023

(65) Prior Publication Data

US 2024/0066870 A1 Feb. 29, 2024

(30) Foreign Application Priority Data

Aug. 23, 2022 (JP) ................................ 2022-132456

(51) Int. Cl.
*B41J 2/16* (2006.01)
*B41J 2/14* (2006.01)

(52) U.S. Cl.
CPC ......... *B41J 2/1623* (2013.01); *B41J 2/14032* (2013.01); *B41J 2/14201* (2013.01); *B41J 2/1601* (2013.01); *B41J 2/1607* (2013.01)

(58) Field of Classification Search
CPC .. B41J 2/1623; B41J 2/14032; B41J 2/14201; B41J 2/1601; B41J 2/1607; B41J 2/14024; B41J 2/14145; B41J 2/1603
See application file for complete search history.

(56) References Cited

FOREIGN PATENT DOCUMENTS

JP 2006095960 A * 4/2006

OTHER PUBLICATIONS

Inamoto Tadaki, Ink-Jet Head and Its Manufacturing Method (JP 2006-095960 A), Apr. 13, 2006, Description, Figures 1-7 (Year: 2006).*

* cited by examiner

*Primary Examiner* — Lisa Solomon
(74) *Attorney, Agent, or Firm* — Canon U.S.A., Inc. IP Division

(57) ABSTRACT

A liquid ejection head includes a recording element substrate and a supporting member. The recording element substrate includes ejection ports that eject liquid, pressure chambers that communicate with respective ejection ports and are supplied with the liquid, and a liquid supply path that supplies the liquid to the pressure chambers. The supporting member is joined with the recording element substrate via an adhesive. The liquid supply path faces a joining portion of the recording element substrate and the supporting member, and includes at least one recess portion on an inner surface of the liquid supply path.

18 Claims, 8 Drawing Sheets

LIQUID EJECTION HEAD AND METHOD OF MANUFACTURING THE SAME

BACKGROUND

Field

The present disclosure relates to a liquid ejection head and a method of manufacturing the liquid ejection head.

Description of the Related Art

As a conventional liquid ejection head of a liquid ejection recording apparatus, a configuration in which a recording element substrate including energy generation elements and pressure chambers is fixed to a supporting member with a thermosetting adhesive is known. The adhesive cures by heating, but viscosity of the adhesive is temporarily lowered by heat when the adhesive cures. The adhesive that has become flowable due to lowered viscosity may reach the pressure chambers through an inner wall of a liquid supply path of the recording element substrate by capillary force. Japanese Patent Application Laid-Open No. 2006-095960 discusses a liquid ejection head in which convex portions to inhibit flow of the adhesive are provided on the inner wall of the liquid supply path. The convex portions are each made of a photocurable adhesive.

In the conventional liquid ejection head, high accuracy is necessary for applying the adhesive because the convex portions are each made of the adhesive. Accordingly, depending on the size of the recording element substrate, ensuring the accuracy is difficult, and a possibility of the adhesive reaching the pressure chambers increases.

SUMMARY

The present disclosure is directed to a liquid ejection head in which the adhesive does not easily enter the pressure chambers during manufacture.

According to an aspect of the present disclosure, a liquid ejection head includes a recording element substrate including ejection ports configured to eject liquid, pressure chambers configured to communicate with respective ejection ports and to be supplied with the liquid, and a liquid supply path configured to supply the liquid to the pressure chambers, and a supporting member joined with the recording element substrate via an adhesive, wherein the liquid supply path faces a joining portion of the recording element substrate and the supporting member, and includes at least one recess portion on an inner surface of the liquid supply path.

Further features of the present disclosure will become apparent from the following description of exemplary embodiments with reference to the attached drawings.

DESCRIPTION OF THE EMBODIMENTS

Figure 1A:
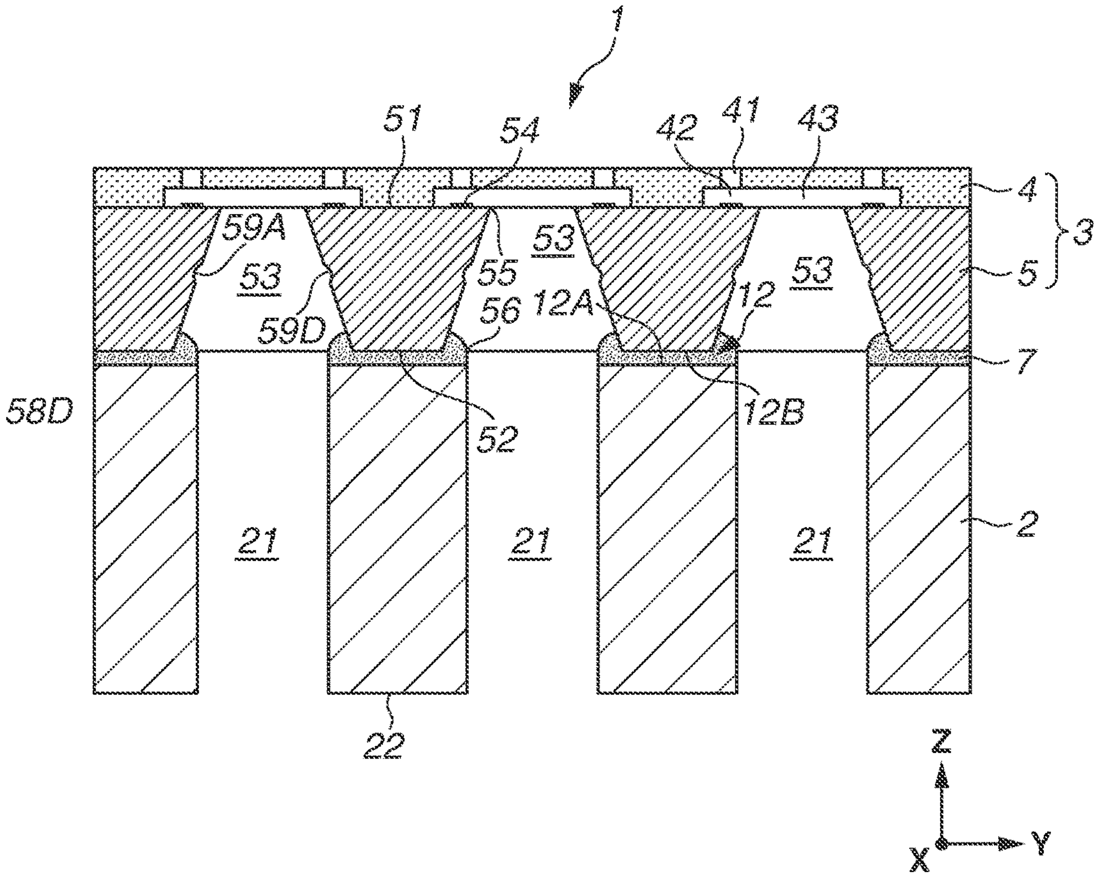
FIG. 1A is a cross-sectional view of a main part of a liquid ejection head according to a first exemplary embodiment of the present disclosure.

Some exemplary embodiments of the present disclosure will be described below with reference to drawings. In the following description, an X direction is a direction in which ejection ports 41 are arrayed, a direction in which ejection port arrays extend, or a longitudinal direction of a liquid supply path 53. A Y direction is a direction in which a plurality of ejection port arrays is arranged or a transverse direction of the liquid supply path 53, and is orthogonal to the X direction. A Z direction is a direction in which a supporting member 2 and a recording element substrate 3 are stacked or a liquid ejection direction, and is orthogonal to the X direction and the Y direction. A liquid ejection head 1 according to the exemplary embodiments is an inkjet recording head that ejects ink; however, liquid to be ejected is not limited to the ink, and includes all liquid ejectable from the liquid ejection head.

(Basic Configuration of Liquid Ejection Head 1)

Figure 1B:
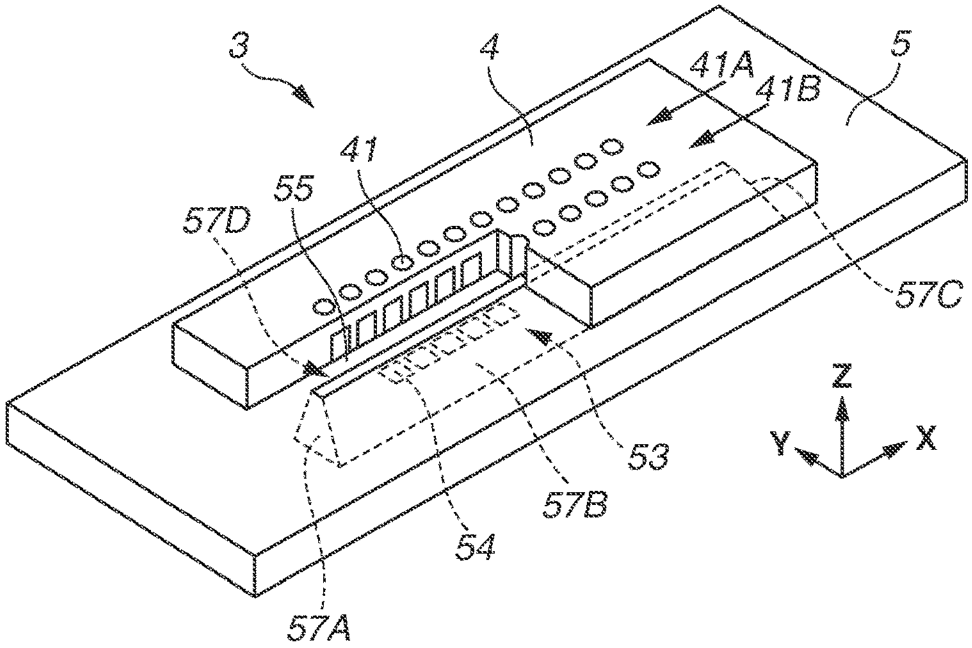
FIG. 1B is a partial perspective view of a recording element substrate of the liquid ejection head illustrated in FIG. 1A.

A first exemplary embodiment will be described. FIG. 1A is a cross-sectional view of a main part of the liquid ejection head 1 according to the first exemplary embodiment of the present disclosure. FIG. 1B is a partial perspective view of the recording element substrate 3 of the liquid ejection head 1 illustrated in FIG. 1A.

Figure 2A:
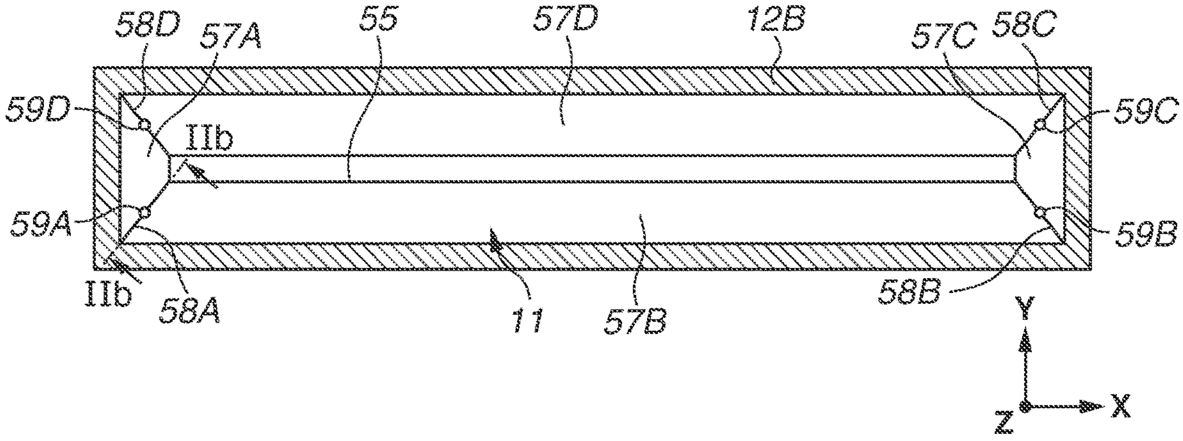
FIG. 2A is a diagram illustrating the recording element substrate according to the first exemplary embodiment of the present disclosure as viewed from a second surface (rear surface)
Figure 2B:
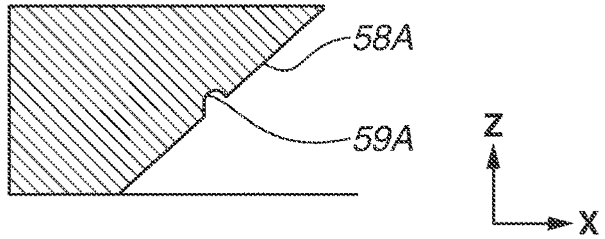
FIG. 2B is an enlarged cross-sectional view taken along line IIb-IIb in FIG. 2A.

FIG. 2A is a diagram of the recording element substrate 3 as viewed from a second surface 52 (rear surface). FIG. 2B is an enlarged cross-sectional view taken along line IIb-IIb in FIG. 2A. The liquid ejection head 1 includes the supporting member 2 and the recording element substrate 3. The recording element substrate 3 is joined to the supporting member 2 with an adhesive 7.

The recording element substrate 3 includes an ejection port forming member 4 including a plurality of ejection ports 41 from which the ink is ejected, and a substrate 5 supporting the ejection port forming member 4.

The substrate 5 includes energy generation elements 54 providing energy to the ink for the ink to be ejected from the ejection ports 41. The energy generation elements 54 are electrothermal conversion elements, but may be elements ejecting the ink based on the other principle, like piezoelectric elements. The substrate 5 has a substantially rectangular parallelepiped shape, and includes a first surface 51 facing the ejection port forming member 4 and the second surface 52, which is the rear surface of the first surface 51. The substrate 5 includes liquid supply path 53 penetrating through the substrate 5 from the first surface 51 to the second surface 52 in the Z direction. As illustrated in FIG. 1B, the liquid supply path 53 is a path elongated in the X direction, and is shared by the plurality of ejection ports 41. As illustrated in FIG. 1A, a plurality of liquid supply paths 53 is provided, and is arranged with predetermined intervals in the Y direction.

The substrate 5 is made of monocrystalline silicon, and the liquid supply path 53 is formed by anisotropic etching as described below. Therefore, the liquid supply path 53 has a truncated square pyramid shape. More specifically, the liquid supply path 53 includes a rectangular first opening 55 that opens to the first surface 51, and a rectangular second opening 56 that opens to the second surface 52. The first opening 55 and the second opening 56 are parallel to each other, and the second opening 56 has an opening area greater than an opening area of the first opening 55. As illustrated in FIG. 2A, an inner surface 11 of the liquid supply path 53 includes four planar side surfaces 57A to 57D connecting the first opening 55 and the second opening 56. Among the four side surfaces 57A to 57D, the paired side surfaces 57A and 57C facing each other have the same shape, and the paired side surfaces 57B and 57D facing each other have the same shape. The four side surfaces 57A to 57D each form the same angle to the second surface 52.

As illustrated in FIG. 2A, linear boundary lines 58A to 58D are respectively provided between the side surfaces 57A and 57B adjacent to each other, between the side surfaces 57B and 57C adjacent to each other, between the side surfaces 57C and 57D adjacent to each other, and between the side surfaces 57D and 57A adjacent to each other. Accordingly, the liquid supply path 53 includes the four boundary lines 58A to 58D. The four boundary lines 58A to 58D are inclined to a line perpendicularly drawn from the first and second openings 55 and 56 (line parallel to Z direction).

The ejection port forming member 4 includes the plurality of ejection ports 41 for ejecting the ink. As illustrated in FIG. 1B, the plurality of ejection ports 41 forms ejection port arrays 41A and 41B extending in the X direction. One ejection port array (41A or 41B) is provided on sides of the liquid supply path 53. FIG. 1B illustrates only one liquid supply path 53 and the ejection port arrays 41A and 41B positioned on the respective sides of the liquid supply path 53. The ejection ports 41 face the respective corresponding energy generation elements 54 in the Z direction. As illustrated in FIG. 1A, the pressure chamber 42 is provided between each of the ejection ports 41 and the corresponding energy generation element 54. The pressure chambers 42 communicate with the respective ejection ports 41, and communicate with the liquid supply path 53 of the substrate 5 via a communication flow path 43. The pressure chambers 42 and the communication flow path 43 are provided between the ejection port forming member 4 and the substrate 5. The pressure chambers 42 are provided for the respective ejection ports 41.

The supporting member 2 has not only a function of supporting the recording element substrate 3 but also a function of supplying the ink to the communication flow path 43 and the pressure chambers 42 via the liquid supply path 53 of the recording element substrate 3. The supporting member 2 includes a liquid flow path 21 communicating with the liquid supply path 53, and the ink is supplied from the liquid flow path 21 to the liquid supply path 53. The supporting member 2 may support a plurality of recording element substrates 3. An end surface 12A of the supporting member 2 facing the substrate 5 is wider than an end surface 12B of the substrate 5 facing the supporting member 2, and can hold the adhesive 7 extruded from a space between the supporting member 2 and the substrate 5. A region between the supporting member 2 and the recording element substrate 3 (substrate 5) forms a joining portion 12 of the supporting member 2 and the substrate 5.

The joining portion 12 is made of the adhesive 7. The recording element substrate 3 is joined to the supporting member 2 with the adhesive 7 such that the liquid supply path 53 faces the joining portion 12 of the recording element substrate 3 and the supporting member 2.

The ink is supplied to the pressure chambers 42 through the liquid flow path 21, the liquid supply path 53, and the communication flow path 43. At ejection of the ink (at recording), electric pulses as recording signals are applied to the energy generation elements 54 to provide thermal energy to the ink in the pressure chambers 42. Bubble pressure occurs in the ink by phase change (foaming or boiling) of the ink, and the ink in a liquid phase is ejected from the ejection ports 41 by the bubble pressure.

(Comparative Example)

Figure 3A:
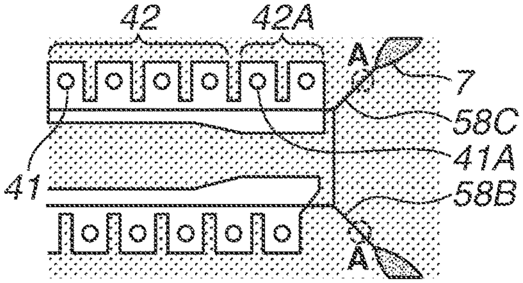
FIGS. 3A to 3J are diagrams illustrating issues regarding a liquid ejection head according to a comparative example.
Figure 3B:
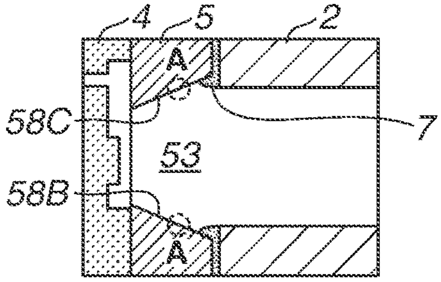
Figure 3C:
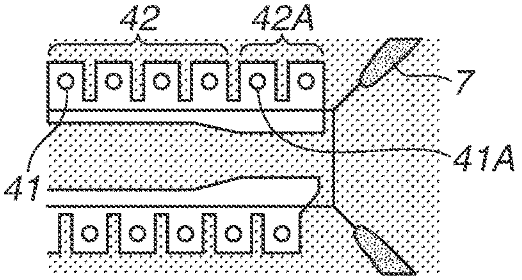
Figure 3D:
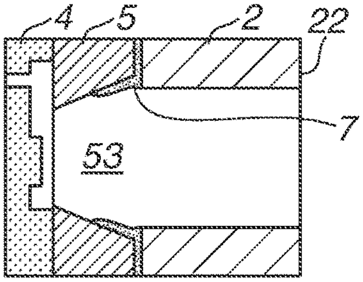
Figure 3E:
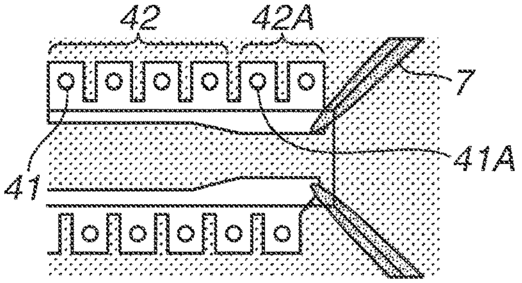
Figure 3F:
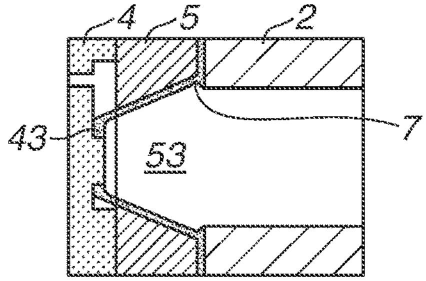
Figure 3G:
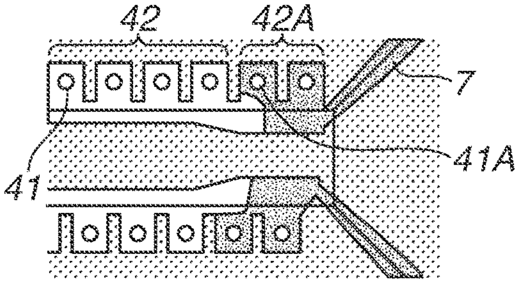
Figure 3H:
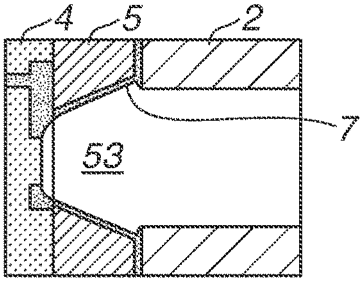
Figure 3I:
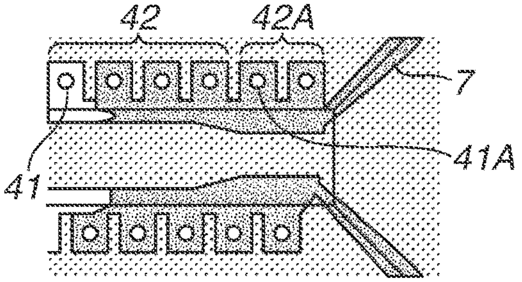
Figure 3J:
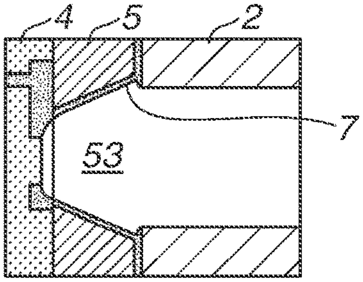

A liquid ejection head according to a comparative example will be described. FIGS. 3A to 3J are diagrams illustrating issues regarding the liquid ejection head according to the comparative example. FIGS. 3A and 3B are a plan view and a side view illustrating a state immediately after the recording element substrate 3 is joined to the supporting member 2, and FIGS. 3C and 3D are a plan view and a side view illustrating a state thereafter. FIGS. 3E and 3F are a plan view and a side view illustrating a state further thereafter, FIGS. 3G and 3H are a plan view and a side view illustrating a state further thereafter, and FIGS. 3I and 3J are a plan view and a side view illustrating a state further thereafter.

The adhesive 7 joining the recording element substrate 3 to the supporting member 2 is a thermosetting adhesive. Although details of a method of manufacturing the liquid ejection head 1 are to be described below, the recording element substrate 3 is pressed against the supporting member 2 before being heated, and a part of the adhesive 7 is accordingly extruded from the space between the supporting member 2 and the recording element substrate 3 (substrate 5). In a case where an application amount of adhesive 7 is excessively large or in a case where an application position is deviated, an extrusion amount of adhesive 7 may increase.

FIGS. 3A and 3B illustrate a state where the recording element substrate 3 is pressed after the adhesive 7 is applied to the supporting member 2. The adhesive 7 is positioned on a bottom part of the substrate 5, and is partially extruded. FIGS. 3C and 3D illustrate a state immediately after a rear surface 22 of the supporting member 2 is heated in order to thermally cure the adhesive 7.

When the adhesive 7 is cured by heating, viscosity of the adhesive 7 is temporarily lowered immediately before curing. The extruded adhesive 7 becomes flowable due to lowering in viscosity. Therefore, the adhesive 7 flows toward the ejection port forming member 4 along the boundary lines (only 58B and 58C are illustrated in FIGS. 3A to 3J) of the liquid supply path 53 by capillary force. FIGS. 3E and 3F illustrate a state where the adhesive 7 has intruded the communication flow path 43. A portion where the adhesive 7 flows is not limited to the boundary line; however, the adhesive 7 flows mainly along the boundary line because strong capillary force generally acts at the boundary line.

FIGS. 3G and 3H illustrate a state where the adhesive 7 has intruded dummy pressure chambers 42A. The dummy pressure chambers 42A are pressure chambers including no energy generation element 54, and are disposed at both side ends of each of the ejection port arrays 41A and 41B in the X direction (two dummy pressure chambers are provided on each side end in this example). The ink is difficult to flow at ends of the liquid supply path 53 in the longitudinal direction (X direction). Therefore, bubbles occurring in the ink also easily remain at the ends of the liquid supply path 53. The bubbles more easily remain at the ends of the liquid supply path 53 because the bubbles easily adhere to a wall. Therefore, the dummy pressure chambers 42A and dummy ejection ports 41 are provided at the ends of the liquid supply path 53. The pressure chambers 42 and the ejection ports 41 for ejecting the ink are provided separately from the ends of the liquid supply path 53 via the dummy pressure chambers 42A and the dummy ejection ports 41. This reduces influence of the bubbles on ejection of the ink. FIGS. 3I and 3J illustrate a state where the adhesive 7 has intruded the pressure chambers 42. At this stage, a possibility that the ink ejection function of the liquid ejection head 1 is directly influenced increases.

In the liquid ejection head discussed in Japanese Patent Application Laid-Open No. 2006-95960, the convex portions are provided on the boundary lines 58A to 58D of the liquid supply path 53. The convex portions are provided at portions A in FIGS. 3A and 3B. Providing the convex portions makes it possible to suppress flow of the adhesive 7 along the boundary lines 58A to 58D to some extent. However, the convex portions are formed by applying the adhesive made of an organic material to excessively narrow regions. Thus, strict management is necessary in an application step. In a case where the recording element substrate 3 is downsized, application accuracy of the adhesive may become insufficient, and the adhesive for forming the convex portions may intrude the pressure chambers 42. The convex portions may drop off from the liquid supply path 53 in use, which may adversely affect the ink ejection performance. Accordingly, in the first exemplary embodiment, at least one recess portion is provided on the inner surface 11 of the liquid supply path 53. The recess portion is formed by irradiation with a laser beam.

As illustrated in FIG. 2A, in the present exemplary embodiment, recess portions 59A to 59D are respectively provided one by one on the four boundary lines 58A to 58D. The recess portions 59A to 59D each have a substantially circular peripheral part (opening). It is sufficient to provide the recess portion on at least one boundary line; however, in the present exemplary embodiment, to surely achieve an effect by the recess portion, the recess portions 59A to 59D are respectively provided on the boundary lines 58A to 58D.

In the present exemplary embodiment, the recess portions 59A to 59D are respectively provided near centers of the boundary lines 58A to 58D in the length direction. The positions of the recess portions 59A to 59D on the boundary lines 58A to 58D are not particularly limited; however, the recess portions 59A to 59D are preferably formed within 60% of the lengths of the boundary lines 58A to 58D with center parts of the boundary lines 58A to 58D in the length directions as centers, respectively.

If the recess portions 59A to 59D are positioned close to the second opening 56, the recess portions 59A to 59D may be filled with the extruded adhesive 7. If the recess portions 59A to 59D are positioned close to the first opening 55, the energy generation elements 54 may be influenced when an irradiation position of the laser beam is deviated.

Figure 2C:
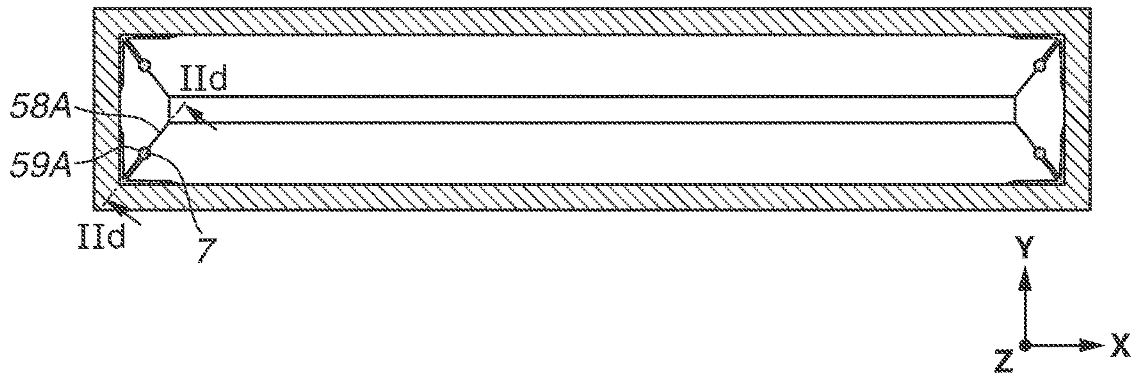
FIG. 2C is a diagram illustrating a flowing state of an adhesive in FIG. 2A.
Figure 2D:
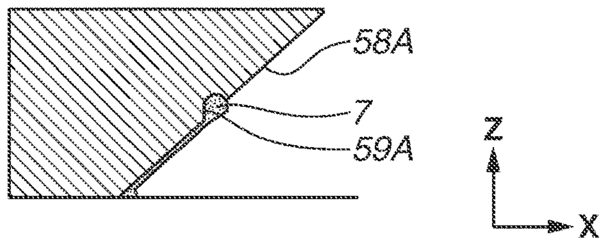
FIG. 2D is an enlarged cross-sectional view taken along line IId-IId in FIG. 2C.

FIGS. 2C and 2D illustrate a flowing state of the adhesive 7 in FIGS. 2A and 2B. FIG. 2D is an enlarged cross-sectional view taken along line IId-IId in FIG. 2C. When the recording element substrate 3 is heated after the recording element substrate 3 is pressed against the supporting member 2, the adhesive 7 having viscosity temporarily lowered as described above flows along the boundary lines 58A to 58D by capillary force. However, the adhesive 7 is captured by the recess portions 59A to 59D. Thus, the adhesive 7 is prevented from further flowing toward the pressure chambers 42. In other words, in the present exemplary embodiment, the adhesive 7 reaches the state illustrated in FIGS. 3C and 3D, but transition to the state illustrated in FIGS. 3E and 3F hardly occurs. The adhesive 7 is cured while being captured by the recess portions 59A to 59D. As a result, on the boundary lines provided with the recess portions, the adhesive 7 is provided only in sections (including recess portions) between the recess portions and the joining portion 12. This makes it possible to reduce the possibility that the adhesive 7 intrudes the pressure chambers 42. Depending on the amount of adhesive 7, the adhesive 7 may not reach the recess portions 59A to 59D.

Sizes of the recess portions 59A to 59D are determined such that the adhesive 7 cures inside the liquid supply path 53 in consideration of a flowing speed and a curing speed of the adhesive 7 in addition to a necessary bonding area, the application amount of adhesive 7, the extrusion amount of adhesive 7, and a heat curing condition of the adhesive 7. The sizes of the recess portions 59A to 59D can be controlled by the number of irradiation shots and irradiation positions of the laser beam. The same position is irradiated with the laser beam a plurality of times, which makes it possible to form a deep recess portion. Shifting the position irradiated with the laser beam little by little makes it possible to form the recess portion having a large area. These irradiation methods can be used together. In a case where a thickness of the substrate 5 is small, formation of the shallow and large recess portions 59A to 59D by shifting the positions irradiated with the laser beam is advantageous in some cases.

In the present exemplary embodiment, the transition to the state illustrated in FIGS. 3E and 3F hardly occurs. As a result, the adhesive 7 hardly intrudes the dummy pressure chambers 42A. In other words, transition to the state illustrated in FIGS. 3G and 3H hardly occurs. Even when the adhesive 7 intrudes the dummy pressure chambers 42A, the ink can be ejected as long as the adhesive 7 does not intrude the pressure chambers 42. The adhesive 7 that has intruded and cured in the dummy pressure chambers 42A acts similarly to walls at the ends of the liquid supply path 53. Therefore, the bubbles may easily adhere to the adhesive 7, and may have an adverse effect on ejection of the ink. According to the present exemplary embodiment, since the adhesive 7 hardly intrudes the dummy pressure chambers 42A, it is possible to further reduce influence on ejection of the ink.

Figure 4A:
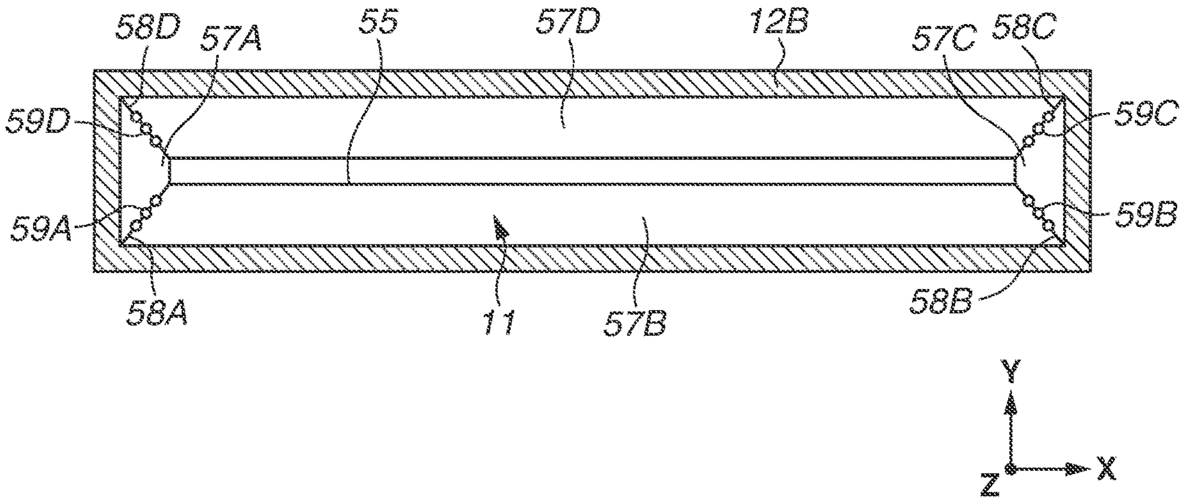
FIGS. 4A and 4B are schematic diagrams illustrating a recording element substrate according to a modification of the first exemplary embodiment.
Figure 4B:
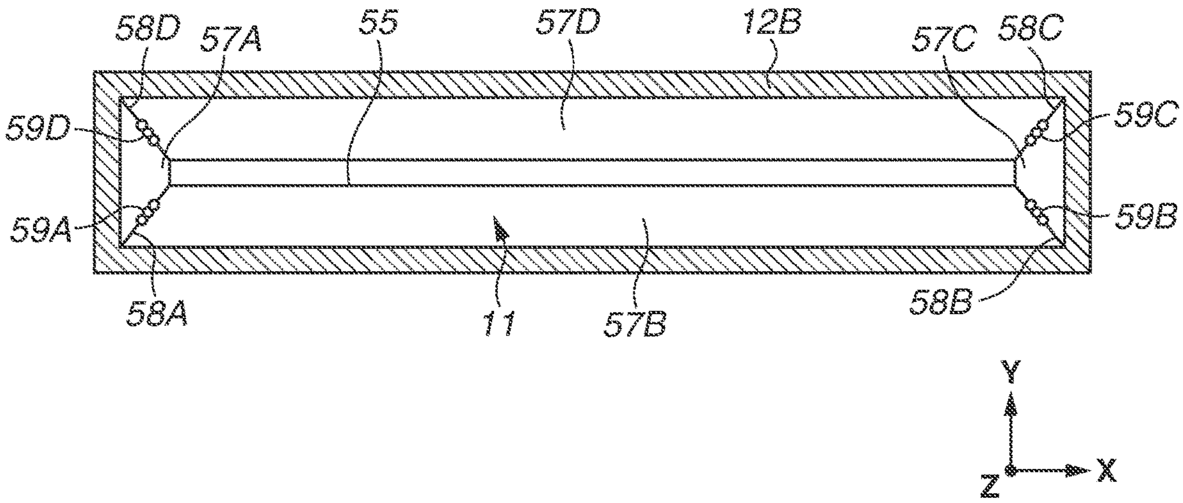

A plurality of recess portions 59A, a plurality of recess portions 59B, a plurality of recess portions 59C, and a plurality of recess portions 59D may be respectively provided on the boundary lines 58A to 58D. As illustrated in FIG. 4A, the plurality of recess portions (59A, 59B, 59C, or 59D) on each of the boundary lines 58A to 58D may be provided separately from one another, or as illustrated in FIG. 4B, the plurality of recess portions (59A, 59B, 59C, or 59D) on each of the boundary lines 58A to 58D may be provided to be coupled to one another. Both configurations are effective in a case where the extrusion amount of adhesive 7 is large and cannot be sufficiently covered by one recess portion.

(Method of Manufacturing Recording Element Substrate 3)

The method of manufacturing the above-described liquid ejection head 1 will be described. First, a method of manufacturing the recording element substrate 3 will be described with reference to FIGS. 5A to 5G. In FIGS. 5A to 5G, the energy generation elements 54 and the ejection ports 41 are provided only on one side of the liquid supply path 53 for convenience; however, the energy generation elements 54 and the ejection ports 41 can be provided on both sides of the liquid supply path 53 as illustrated in FIGS. 1A and 1B.

Figure 5A:
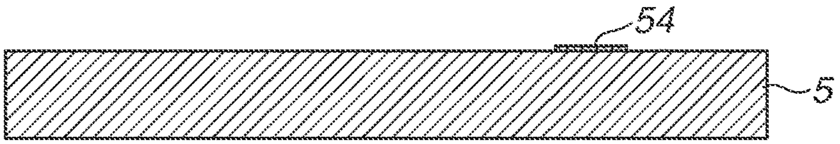
FIGS. 5A to 5G are diagrams illustrating steps of manufacturing the recording element substrate.
Figure 5B:
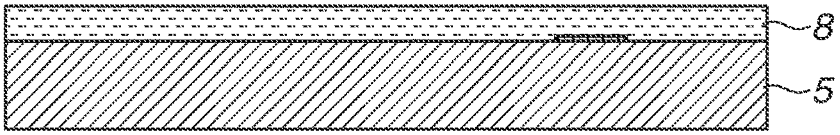
Figure 5C:
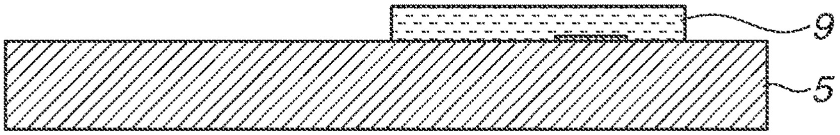
Figure 5D:
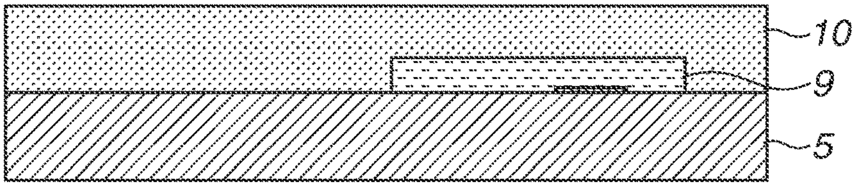
Figure 5E:
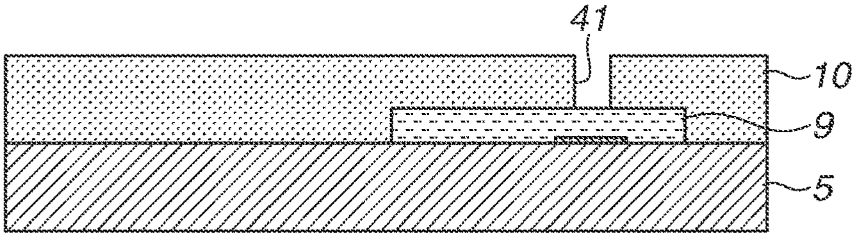

First, as illustrated in FIG. 5A, the plurality of energy generation elements 54 is formed on the substrate 5 (only one energy generation element is illustrated in FIG. 5A). Next, as illustrated in FIG. 5B, a soluble resin layer 8 is formed on the substrate 5 provided with the energy generation elements 54. Next, as illustrated in FIG. 5C, the resin layer 8 is formed into a shape of the pressure chambers 42 and the communication flow path 43 to form a mold material 9. Next, as illustrated in FIG. 5D, a resin layer 10 that becomes the ejection port forming member 4 is formed on the mold material 9. Next, as illustrated in FIG. 5E, the ejection ports 41 are formed in the resin layer 10. The ejection ports 41 can be formed by etching with $O_2$ plasma or irradiation with excimer laser, or can be formed by exposure to ultraviolet rays, Deep-UV light, or the like.

Figure 5F:
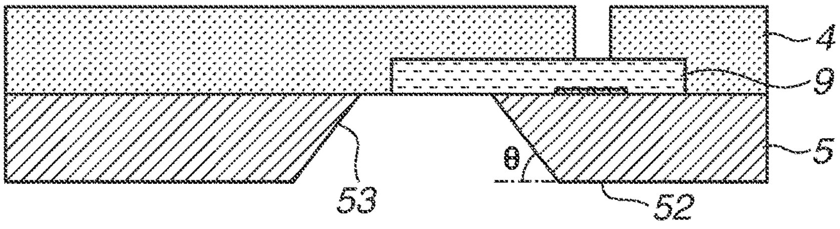
Figure 5G:
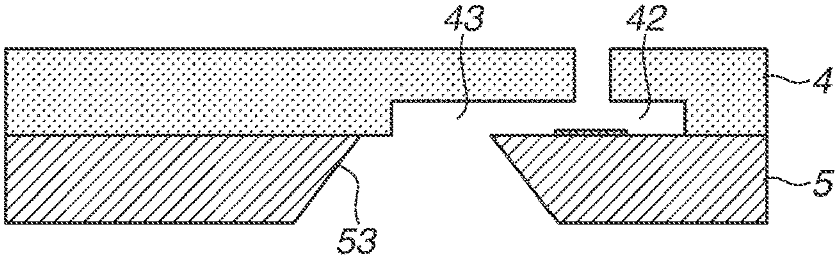

Next, as illustrated in FIG. 5F, the liquid supply path 53 is formed in the substrate 5. The liquid supply path 53 is formed by chemically etching the substrate 5. More specifically, anisotropic etching with a strong alkaline solution such as potassium hydroxide (KOH), sodium hydroxide (NaOH), and tetramethylammonium hydroxide (TMAH) is performed on the substrate 5. When the second surface 52 of the substrate 5 is taken as a (100) plane, an angle θ formed by the second surface 52 and each of the side surfaces 57A to 57D becomes 54.7 degrees. The liquid supply path 53 can also be formed by optical energy such as laser. However, the method may damage the ejection port forming member 4, the energy generation elements 54, and the like that are already formed. Therefore, a method using chemical etching, in particular, a method using anisotropic etching of a silicon substrate is more preferable. Next, as illustrated in FIG. 5G, the mold material 9 is eluted to form the pressure chambers 42 and the communication flow path 43. By the above-described steps, the ejection port forming member 4 including the ejection ports 41 is provided on the substrate 5.

Next, the recess portions 59A to 59D are formed on the inner surface 11 of the liquid supply path 53 by laser irradiation. A laser type is not particularly limited. In one example, fiber laser was used, and a fundamental wave having a wavelength of 1062 nm was irradiated. A machining depth per one irradiation was set to 4 μm, and a machining diameter was set to 90 μm. Positions near centers of the boundary lines 58A to 58D were irradiated 25 times, and the recess portions 59A to 59D each having the diameter of 90 μm and the depth of 100 μm were accordingly formed.

Next, the recording element substrate 3 fabricated in the above-described manner is joined to the supporting member 2. First, the adhesive 7 is transferred or applied (hereinafter, referred to as application) to the end surface 12A (see FIG. 1A) of the supporting member 2 facing the recording element substrate 3. Next, the recording element substrate 3 is positioned with respect to the supporting member 2 (end surface 12B of substrate 5 is positioned with respect to end surface 12A of supporting member 2), and the recording element substrate 3 is pressed against the supporting member 2. The recording element substrate 3 can be positioned with high accuracy by using an image processing technique. A part of the adhesive 7 is extruded from the space between the recording element substrate 3 and the supporting member 2 to the side surfaces 57A to 57D of the recording element substrate 3. Next, in a state where the recording element substrate 3 is pressed against the supporting member 2, the supporting member 2 is heated from the rear surface 22 (see FIG. 1A). The adhesive 7 between the supporting member 2 and the recording element substrate 3 and the adhesive 7 extruded from the space between the supporting member 2 and the recording element substrate 3 are cured, and the recording element substrate 3 is temporarily fixed to the substrate 5. Note that actual fixing of the recording element substrate 3 to the supporting member 2 is performed using a heating furnace in a subsequent step; however, description of details of the step is omitted. The application amount of adhesive 7 is adjusted such that an appropriate amount of adhesive 7 is extruded from the space between the recording element substrate 3 and the supporting member 2 by pressing. As a result, the space between the supporting member 2 and the recording element substrate 3 is filled with the adhesive 7, sufficient joining is performed, and movement (leakage) of the ink between the liquid supply paths 53 adjacent to each other hardly occurs.

Figure 6A:
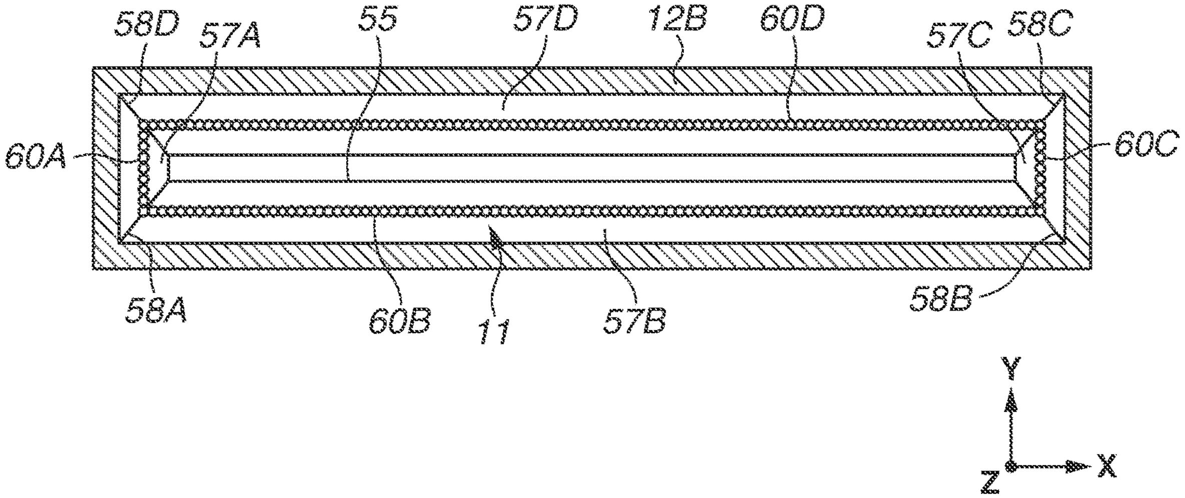
FIGS. 6A and 6B are schematic diagrams illustrating a recording element substrate according to a second exemplary embodiment of the present disclosure.

A second exemplary embodiment will be described. FIG. 6A is a diagram illustrating the recording element substrate 3 according to the second exemplary embodiment of the present disclosure as viewed from the second surface 52 (rear surface) similar to FIG. 2A. The second exemplary embodiment is similar to the first exemplary embodiment except for the configurations of the recess portions. The plurality of recess portions is provided on each of the side surfaces 57A to 57D. The plurality of recess portions provided on the side surface 57A forms one recess portion group 60A in which the recess portions are coupled to one another in a line shape. Likewise, the plurality of recess portions provided on the side surfaces 57B to 57D forms recess portion groups 60B to 60D in which the recess portions are coupled to one another linearly. One end of each of the recess portion groups formed on the side surfaces 57A to 57D is positioned on one of boundary lines of the corresponding side surface (e.g., in case of recess portion group 60A, boundary line 58A of side surface 57A), and the other end is positioned on the other boundary line of the corresponding side surface (e.g., in case of recess portion group 60A, boundary line 58D of side surface 57A). The recess portion groups 60A to 60D each linearly extend substantially in parallel to the X direction or the Y direction; however, shapes of the recess portion groups are not particularly limited, and may be, for example, curved shapes or polygonal line shapes. In the present exemplary embodiment, the recess portion groups 60A to 60D are respectively formed at the same Z-direction positions of the side surfaces 57A to 57D, and these recess portion groups 60A to 60D are coupled so as to form one annular shape. In other words, the recess groups are provided on all of the side surfaces 57A to 57D, and have a rectangular shape as a whole.

The recess portion groups are preferably provided on all of the side surfaces 57A to 57D; however, it is sufficient to form the recess portion group on at least one of the plurality of side surfaces 57A to 57D.

Among the recess portions configuring the recess portion groups 60A to 60D, the recess portions positioned on the boundary lines 58A to 58D achieve effects similar to the effects by the recess portions 59A to 59D according to the first exemplary embodiment. In the present exemplary embodiment, the adhesive 7 leaking from the recess portions on the boundary lines 58A to 58D after being captured by the recess portions on the boundary lines 58A to 58D can be further sequentially captured by the other recess portions of the recess portion groups 60A to 60D. A volume to capture the adhesive 7 can be largely secured. Therefore, the present exemplary embodiment is effective in a case where an outflow amount of adhesive 7 is large. Shapes and arrangement regions of the recess portion groups can be appropriately selected based on the shape of the liquid supply path 53.

Figure 6B:
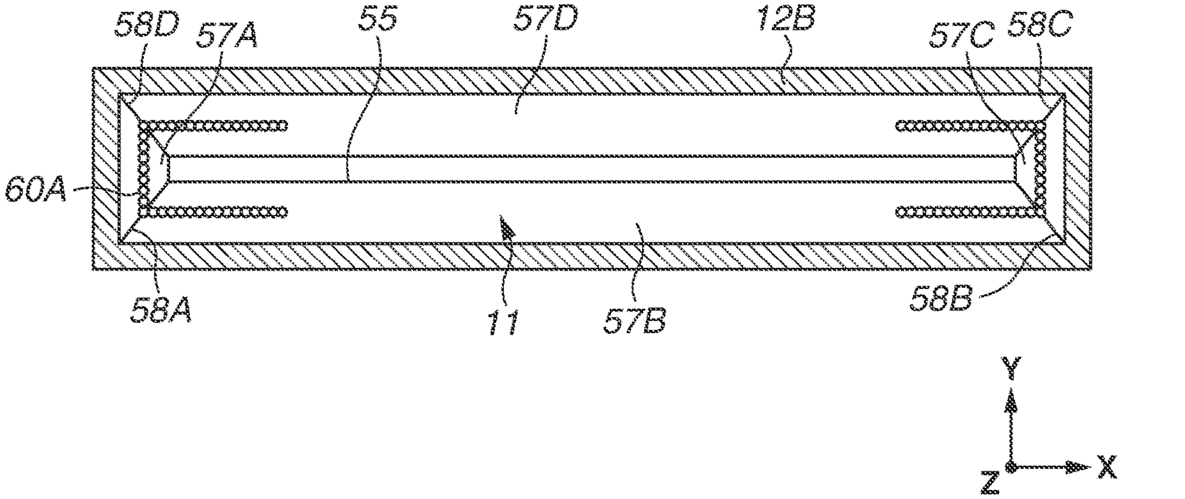

FIG. 6B is a diagram illustrating the recording element substrate 3 according to a modification of the second exemplary embodiment of the present disclosure as viewed from the second surface 52 (rear surface) similar to FIG. 2A. The recess portion at one end of the recess portion group 60A provided on the side surface 57A is positioned on the boundary line 58A of the side surface 57A. In contrast, the recess portion at the other end of the recess portion group 60A is positioned between the first surface 51 and the second surface 52 and between the boundary line 58A and the boundary line 58D of the side surface 57A. The recess portions are similarly positioned as for the other recess portion groups. In other words, the recess portion groups 60A to 60D do not traverse the side surfaces 57A to 57D, and are terminated in the middle of the side surfaces 57A to 57D. Depending on the outflow amount of adhesive 7, the configuration according to the present modification can be adopted in place of the configuration in FIG. 6A.

Figure 7:
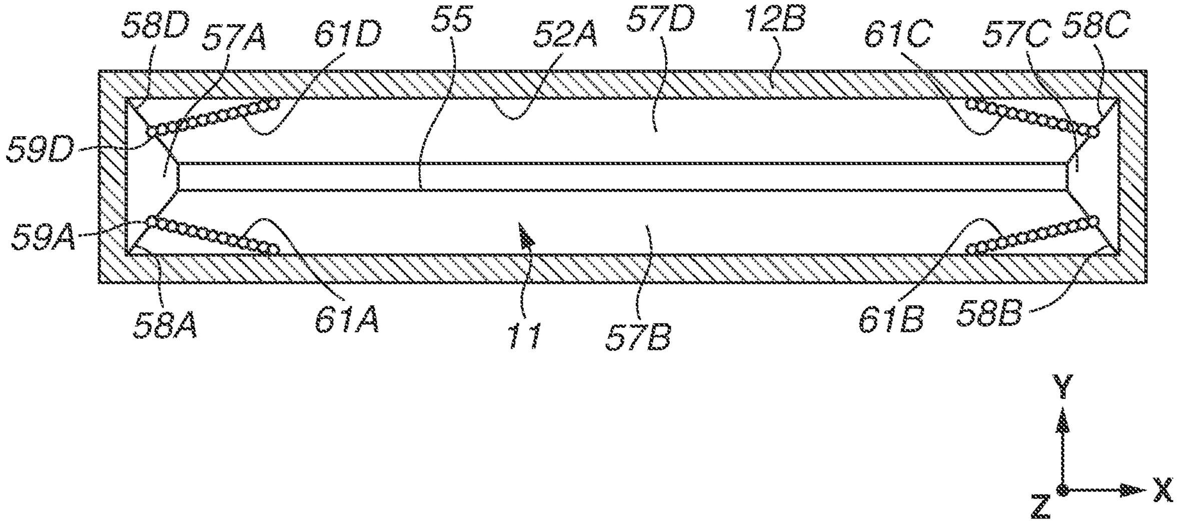
FIG. 7 is a schematic diagram illustrating a recording element substrate according to a third exemplary embodiment of the present disclosure.

A third exemplary embodiment will be described. FIG. 7 is a diagram illustrating the recording element substrate 3 according to the third exemplary embodiment of the present disclosure as viewed from the second surface 52 (rear surface) similar to FIG. 2A. The third exemplary embodiment is similar to the first exemplary embodiment except for the configurations of the recess portions. In the present exemplary embodiment, the plurality of recess portions is provided on each of the side surfaces 57B and 57D. The plurality of recess portions on the side surfaces 57B and 57D form recess portion groups 61A to 61D in which the recess portions are coupled to one another linearly. In the present exemplary embodiment, the recess portions at one ends of the recess portion groups 61A to 61D are positioned on the boundary lines 58A to 58D, and the recess portions on the other ends are positioned at an intersection portion 52A between the second surface 52 and the inner surface 11 (peripheral portion of end surface 12B of substrate 5).

The recess portions positioned on the boundary lines 58A to 58D achieve effects similar to the effects by the recess portions 59A to 59D according to the first exemplary embodiment. As in the second exemplary embodiment, the adhesive 7 leaking from the recess portions on the boundary lines 58A to 58D after being captured by the recess portions on the boundary lines 58A to 58D is further sequentially captured by the other recess portions of the recess portion groups 61A to 61D. The recess portion groups 61A to 61D according to the present exemplary embodiment each have a shape guiding and returning the adhesive 7 to the intersection portion 52A of the second surface 52 and the inner surface 11. In a case where the outflow amount of adhesive 7 varies depending on a position in a circumferential direction of the second opening 56, the adhesive 7 can be guided from a portion where the outflow amount is large to a portion where the outflow amount is small, and the outflow amount of adhesive 7 can be further uniformized at an edge portion of the second opening 56. The number and positions of the recess portion groups are not limited, and it is sufficient to form at least one recess portion group on at least one side surface.

Figure 8A:
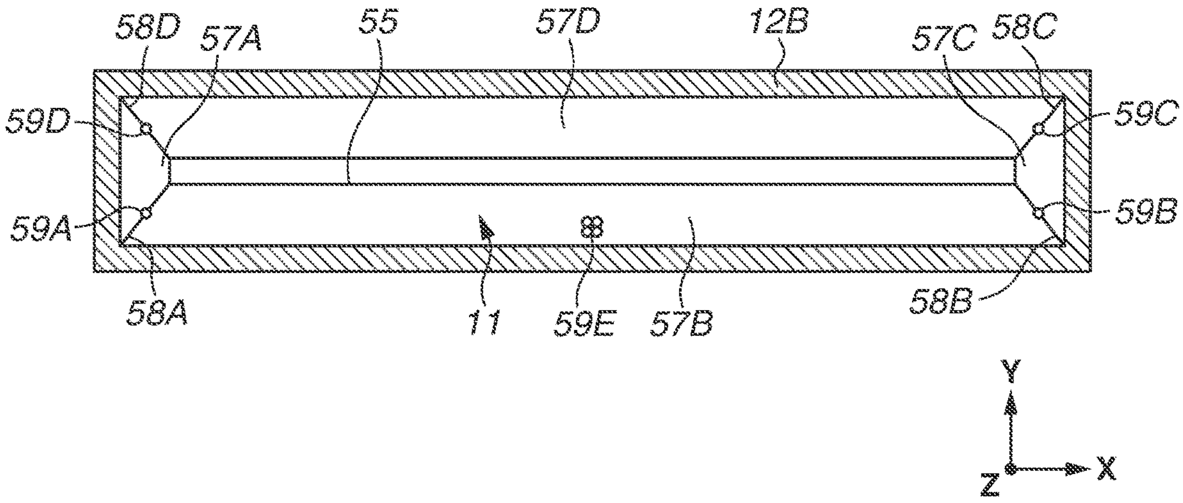
FIGS. 8A and 8B are schematic diagrams illustrating a recording element substrate according to a fourth exemplary embodiment of the present disclosure.

A fourth exemplary embodiment will be described. FIG. 8A is a diagram illustrating the recording element substrate 3 according to the fourth exemplary embodiment of the present disclosure as viewed from the second surface 52 (rear surface) similar to FIG. 2A. The fourth exemplary embodiment is similar to the first exemplary embodiment except for the configurations of the recess portions. In the present exemplary embodiment, at least one recess portion 59E is positioned at a place on the side surface 57B separated from the boundary lines 58A and 58B (center part of recording element substrate 3 in longitudinal direction). The number and positions of the recess portions are not limited, and it is sufficient to form at least one recess portion on at least one side surface.

Figure 8B:
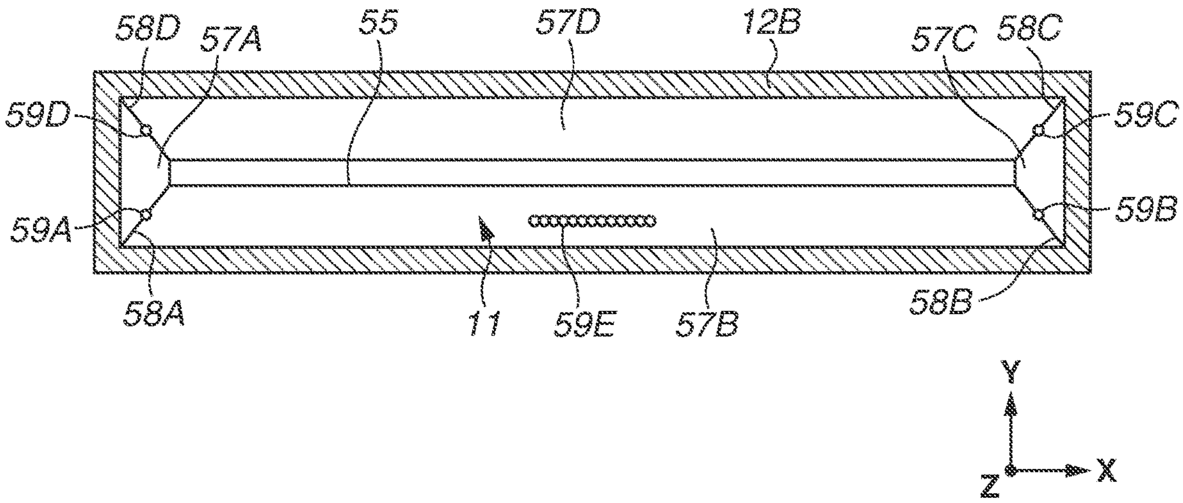

The adhesive 7 normally flows along the boundary lines 58A to 58D. In a case where there is a place where the adhesive 7 specifically easily flows other than the boundary lines 58A to 58D, the recess portion 59E is formed at that position in isolation. The term "in isolation" means that the recess portion 59E is not directly connected to the recess portions on the boundary lines 58A to 58D, and is not indirectly (i.e., via other recess portions) connected to the recess portions on the boundary lines 58A to 58D as well. Although only one recess portion 59E may be provided, a plurality of recess portions 59E may be coupled as illustrated in FIG. 8A. As illustrated in FIG. 8B, the plurality of recess portions 59E may be coupled linearly as in the second exemplary embodiment and the third exemplary embodiment. The configuration illustrated in FIG. 8B is effective in a case where the place where the adhesive 7 specifically easily flows extends over a relatively wide range. The present exemplary embodiment can be appropriately combined with the first to third exemplary embodiments.

Examples of the place where the adhesive 7 specifically easily flows include a place near a place where the extrusion amount of adhesive 7 is large. Such a place can be identified by disassembly and analysis of the liquid ejection head 1, and analysis of a path where the adhesive 7 is applied (application amount may be large and extrusion amount may be increased accordingly at the start point and end point of application). Examples of the place where the adhesive 7 specifically easily flows further include a place near a place where a temperature is difficult to be increased at heating. At the place where the temperature is difficult to be increased, it takes a time for the adhesive 7 to reach the temperature at which curing reaction occurs, and the low viscosity state may continue for a relatively long time. Such a place can be known from temperature distribution (acquired by measurement or simulation) at heating.

The present disclosure is not limited to the above-described exemplary embodiments. Since the adhesive 7 normally flows along the boundary lines 58A to 58D on the inner surface 11 of the liquid supply path 53, the recess portions are provided on the boundary lines in each of the exemplary embodiments. However, a form in which the recess portion 59E is provided only at the position separated from the boundary lines 58A to 58D of the side surfaces 57A to 57D is also included in the present disclosure. Further, the liquid supply path 53 is divided into a plurality of flow paths in a longitudinal direction in some cases, in place of one large flow path illustrated in each of the exemplary embodiments. Even in such a configuration, the recess portions according to the exemplary embodiments of the present disclosure can be provided at predetermined positions on the inner surface 11 of the liquid supply path 53 where the adhesive 7 easily flows.

According to the exemplary embodiments of the present disclosure, it is possible to provide the liquid ejection head in which the adhesive hardly intrudes the pressure chambers during manufacture.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-132456, filed Aug. 23, 2022, which is hereby incorporated by reference herein in its entirety.

What is claimed is:

1. A liquid ejection head comprising:

a recording element substrate including ejection ports configured to eject liquid, pressure chambers configured to communicate with respective ejection ports and to be supplied with the liquid, and a liquid supply path configured to supply the liquid to the pressure chambers, having an ejection port forming member provided with the ejection ports, and a substrate supporting the ejection port forming member and wherein the liquid supply path penetrates through the substrate; and a supporting member joined with the recording element substrate via an adhesive, wherein the liquid supply path faces a joining portion of the recording element substrate and the supporting member, and an inner surface of the liquid supply path includes a plurality of side surfaces and a plurality of boundary lines each provided between two side surfaces, wherein a plurality of recess portions is provided on at least one boundary line of the plurality of boundary lines.

2. The liquid ejection head according to claim 1, wherein the at least one recess portion is provided on each of the plurality of boundary lines.

3. The liquid ejection head according to claim 1, wherein the recess portions are a plurality of recess portions provided on at least one side surface of the plurality of side surfaces, wherein the plurality of recess portions is coupled to one another to form a recess portion group in a line shape, and wherein a recess portion at one end of the recess portion group is positioned on one boundary line of the plurality of boundary lines of the at least one side surface.

4. The liquid ejection head according to claim 3, wherein the substrate includes a first surface facing the ejection port forming member, and a second surface, which is a rear surface of the first surface, and wherein a recess portion at another end, which is one end on a side opposite to the one end of the recess portion group, is positioned at an intersection portion between the second surface and the inner surface of the liquid supply path.

5. The liquid ejection head according to claim 3, wherein a recess portion at another end, which is one end on a side opposite to the one end of the recess portion group, is positioned on another boundary line of the at least one side surface.

6. The liquid ejection head according to claim 3, wherein the recess portion group is provided on each of the plurality of side surfaces to form a recess portion groups, and wherein the recess portion groups are coupled to form one annular shape.

7. The liquid ejection head according to claim 3, wherein the substrate includes a first surface facing the ejection port forming member, and a second surface, which is a rear surface of the first surface, and wherein a recess portion at another end of the recess portion group is positioned between the first surface and the second surface and between the one boundary line and another boundary line of the at least one side surface.

8. The liquid ejection head according to claim 1, wherein the at least one recess portion is provided on at least one side surface of the plurality of side surfaces, and wherein a recess portion provided on the at least one side surface is isolated from the at least one recess portion provided on the at least one boundary line.

9. The liquid ejection head according to claim 8, wherein a plurality of recess portions is provided on the at least one side surface, and wherein the plurality of recess portions is coupled to form a recess portion group in a two-dimensional shape.

10. The liquid ejection head according to claim 8, wherein a plurality of recess portions is provided on the at least one side surface, and wherein the plurality of recess portions is coupled to form a recess portion group in a line shape.

11. The liquid ejection head according to claim 1, wherein the inner surface of the liquid supply path includes a plurality of side surfaces and a plurality of boundary lines each provided between adjacent two side surfaces, and wherein the at least one recess portion is provided only at a position separated from the plurality of boundary lines of the plurality of side surfaces.

12. The liquid ejection head according to claim 1, wherein the substrate includes a first surface facing the ejection port forming member, and a second surface, which is a rear surface of the first surface, wherein the substrate is made of monocrystalline silicone, wherein the second surface of the substrate is a (100) plane, and wherein an angle formed by the second surface and each of side surfaces of the inner surface of the liquid supply path is 54.7 degrees.

13. The liquid ejection head according to claim 1, wherein the supporting member includes a liquid flow path configured to supply the liquid to the liquid supply path.

14. A method of manufacturing a liquid ejection head, the method comprising:

forming at least one recess portion on an inner surface of a liquid supply path of a recording element substrate, wherein the recording element substrate includes ejection ports configured to eject liquid, pressure chambers configured to communicate with respective ejection ports and to be supplied with the liquid, and the liquid supply path is configured to supply the liquid to the pressure chambers;

joining a supporting member with the recording element substrate via an adhesive, wherein the recording element substrate provided with the at least one recess portion, and which causes the liquid supply path to face a joining portion of the recording element substrate and the supporting member; and curing the adhesive by heating.

15. The method according to claim 14, wherein the inner surface of the liquid supply path includes a plurality of side surfaces and a plurality of boundary lines each provided between adjacent two side surfaces, and wherein the at least one recess portion is provided on at least one boundary line of the plurality of boundary lines.

16. The method according to claim 14, further comprising forming the at least one recess portion by laser irradiation.

17. The method according to claim 15, wherein a plurality of the recess portions is provided on one of the plurality of boundary lines.

18. A liquid ejection head comprising:

a recording element substrate including ejection ports configured to eject liquid, pressure chambers configured to communicate with respective ejection ports and to be supplied with the liquid, and a liquid supply path configured to supply the liquid to the pressure chambers, having an ejection port forming member provided with the ejection ports, and a substrate supporting the ejection port forming member and wherein the liquid supply path penetrates through the substrate; and a supporting member joined with the recording element substrate via an adhesive, wherein the liquid supply path faces a joining portion of the recording element substrate and the supporting member, and includes at least one recess portion on an inner surface of the liquid supply path, and wherein the substrate includes a first surface facing the ejection port forming member, and a second surface, which is a rear surface of the first surface, wherein the substrate is made of monocrystalline silicone, wherein the second surface of the substrate is a (100) plane, and wherein an angle formed by the second surface and each of side surfaces of the inner surface of the liquid supply path is 54.7 degrees.

* * * * *